United States Patent [19]

Mashiyama et al.

[11] Patent Number: 5,737,297
[45] Date of Patent: Apr. 7, 1998

[54] OPTICAL HEAD

[75] Inventors: Tomio Mashiyama; Hiroshi Katayama, both of Higashihiroshima; Nobuo Ogata, Nara; Kenji Ikeda, Higashihiroshima, all of Japan

[73] Assignee: Sharp Kabushiki Kaisha, Osaka, Japan

[21] Appl. No.: 797,735

[22] Filed: Feb. 11, 1997

[30] Foreign Application Priority Data

Jun. 21, 1996 [JP] Japan ..................... 8-162070

[51] Int. Cl.⁶ ........................... G11B 7/09
[52] U.S. Cl. .............. 369/109; 369/44.23; 369/112
[58] Field of Search ............... 369/44.41, 44.42, 369/44.23, 120, 112, 109

[56] References Cited

U.S. PATENT DOCUMENTS

| | | | |
|---|---|---|---|
| 5,202,869 | 4/1993 | Miyake et al. | 369/112 |
| 5,629,916 | 5/1997 | Komiya | 369/112 |
| 5,648,946 | 7/1997 | Yamazaki | 369/112 |

FOREIGN PATENT DOCUMENTS

| | | |
|---|---|---|
| 59-036337 | 2/1984 | Japan . |
| 63-004435 | 1/1988 | Japan . |
| 7-230629 | 8/1995 | Japan . |

Primary Examiner—Georgia Y. Epps
Assistant Examiner—Kim-Kwok Chu
Attorney, Agent, or Firm—Nixon & Vanderhye P.C.

[57] ABSTRACT

A light radiated from a light source is divided by a grating into a main beam for detecting information signals and sub-beams for tracking, and thus irradiates a mini disk. The beams reflected by the mini disk are converged through a concave cylindrical mirror on a second light detector composed of adjacently disposed divided light receiving elements H (light receiving parts A and B) and J (light receiving parts C and D) and light receiving elements E1, F1, E2 and F2. The concave cylindrical mirror shapes the reflected beams so that spots of the reflected beams converged on the second light detector take elliptic shapes that are flattened in a direction in which the main beam for detecting the information signals and the sub-beams for tracking are arranged. In this manner, reliability of an optical head can be improved without increasing the size of the light receiving elements and without causing interference between a main spot and sub-spots.

8 Claims, 14 Drawing Sheets

OPTICAL HEAD

FIELD OF THE INVENTION

The present invention relates to an optical head for detecting diffraction by a guide groove formed on a disk (optical recording medium) such as a mini disk.

BACKGROUND OF THE INVENTION

A mini disk (optical recording medium) stores address information in a wobbling guide groove thereof. An optical head for writing data into and/or reading data out of such a mini disk is configured to read the stored address information with, for example, a push-pull method.

The push-pull method detects a light intensity change resulting from diffraction by the guide groove with a divided light receiving element that is divided into two parts. Also, the push-pull method utilizes the phenomenon that the intensity distribution of the light which, after being diffracted and reflected by the guide groove formed on the disk, goes through an objective lens for the second time changes with a relative change between the position of the guide groove and that of the light beam.

To be more specific, as shown in FIG. 9, a light beam from a light source (not shown) is diffracted by a guide groove 72 of a disk 71, and reflected as a zero order diffracted light 73, a positive first order diffracted light 74 and a negative first order diffracted light 75. The diffracted lights are guided to a divided light receiving element 78 of an optical system through an objective lens 76. The divided light receiving element 78 receives lights 77, in which the zero order diffracted light 73 overlaps with the positive first order diffracted light 74 and with the negative first order diffracted light 75, as lights diffracted by the guide groove 72. The divided light receiving element 78 detects light quantities at respective light receiving parts thereof.

A difference between the light quantities detected at the light receiving parts is a push-pull signal. The address information stored in the guide groove 72 is obtained by detecting the push-pull signal.

Incidentally, a so-called three beam method is used for detecting the push-pull signal and a tracking error signal with such a mini disk.

In the three beam method, a light beam from the light source is divided into a main beam, a positive first order sub-beam and a negative first order sub-beam. The three beams, as shown in FIG. 10, form three spots (namely, a main spot $S_{o1}$, a positive first sub-spot $S_{o2}$ and a negative first sub-spot $S_{o3}$) virtually straightly along the guide groove 72. The light receiving elements receive diffracted lights that are reflected lights of the three beams, and detect a tracking error signal from the difference between the light quantities of the two sub-beams. The push-pull signal is detected by using a reflected light of the main beam.

FIG. 11 shows a typical optical head configuration of such an optical head. As shown in FIG. 12, a hologram laser 51 of this optical head is composed of a semiconductor laser 52 that is a light source, a hologram element 53 and a first light detector 54. On a side surface of the hologram element 53 which faces the semiconductor laser 52, a grating 53a is formed as a diffraction grating for dividing a light beam from the semiconductor laser 52 into three light beams. On a side surface of the hologram element 53 which is opposite from the semiconductor laser 52, a hologram 53b whose pitches differ from area to area is formed. The first light detector 54 is a light detector for detecting a focus error signal, and is composed of a divided light receiving element, which is divided into three light receiving parts a, b and c.

A laser beam from the semiconductor laser 52 is divided by the grating 53a of the hologram element 53 into a main beam $B_1$, a positive first order sub-beam $B_2$ and a negative first order sub-beam $B_3$. The main beam $B_1$, as mentioned above, is a light beam for detecting a push-pull signal. The positive first order sub-beam $B_2$ and the negative first order sub-beam $B_3$ are light beams for detecting a tracking error signal.

Zero order diffracted lights of the three beams that have passed through the hologram 53b are converged by a collimating lens 55 shown in FIG. 11. The diffracted lights pass through a beam splitter 58, a vertically turning mirror 56, and an objective lens 57 in this sequence. The above-mentioned three spots $S_{o1}$, $S_{o2}$ and $S_{o3}$ are formed on the disk in this manner (see FIG. 10).

As shown in FIG. 11, the beams reflected by the disk, after passing through the objective lens 57 and the vertically turning mirror 56, are split by the beam splitter 58 into two lights: one towards the collimating lens 55 and the other towards a Wollaston prism 59.

As shown in FIG. 12, the light beam that has been split towards the collimating lens 55 is diffracted by the hologram 53b of the hologram element 53, and the first order diffracted lights of that light beam hit the first light detector 54. The first order diffracted lights are converged at the respective light receiving parts a, b, and c to form spots thereon.

In this case, the focus error signal is given by the following equation:

Focus error signal=a−b wherein a and b represent respective outputs from the light receiving parts a and b of the first light detector 54.

On the other hand, the light beam split towards the Wollaston prism 59 shown in FIG. 11 is separated, as shown in FIG. 13, by the Wollaston prism 59 into an S-component and a P-component that have polarization properties. Then, those separated light beams, after passing through a 45° mirror 60 shown in FIG. 11, are converged at a spot lens 61 and turned at a turning mirror 62 so as to hit a second light detector 63.

When the turning mirror 62 is not provided to the optical head, a second light beam detector 63' is displaced at the position indicated by two-dot chain lines in FIG. 11. The light beams converged by the spot lens 61 directly hit the second light detector 63'.

The second light detector 63 is a light detector for detecting information signals, the push-pull signal and the tracking error signal, and is composed of two light receiving element groups arranged axially symmetrically as shown in FIG. 14.

In FIG. 14, the right-hand light receiving element group includes a divided light receiving element H and light receiving elements E1 and F1. The divided light receiving element H includes divided light receiving parts A and B. The light receiving elements E1 and F1 are placed above and below the divided light receiving element H respectively. Meanwhile, the left-hand light receiving element group includes a divided light receiving element J and light receiving elements E2 and F2. The divided light receiving element J includes divided light receiving parts C and D. The light receiving elements E2 and F2 are placed above and below the divided light receiving element J respectively. The divided light receiving element H is a divided light receiving element for detecting the push-pull signal, whereas the light receiving elements E1, F1, E2 and F2 are elements for detecting the tracking error signal for a servo control.

The separated light of the S-component is configured to hit the right-hand light receiving element group of the second light detector 63 and to form spots thereon, whereas the separated light of the P-component is configured to hit the left-hand light receiving element group of the second light detector 63 and to form spots thereon. The spots here are virtually circular.

That is, as for the separated light of the S-component, the main spot $S_{1S}$ corresponding to the main beam $B_1$ is formed on the divided light receiving element H, and the sub-spots $S_{2S}$ and $S_{3S}$ corresponding to the sub-beams $B_2$ and $B_3$ are formed on the light receiving elements E1 and F1 respectively. Meanwhile, as for the separated light of the P-component, the main spot $S_{1P}$ is formed on the divided light receiving element J, and the sub-spots $S_{2P}$ and $S_{3P}$ are formed on the light receiving elements E2 and F2 respectively.

Here, the information signals (magneto-optical signal and pit signal), the push-pull signal and the tracking error signal of the disk are given by the following equations:

① Information Signals Magneto-Optical Signal=$(A+B)-(C+D)$

Pit Signal=$A+B+C+D$

② Push-Pull Signal=$A-B$

③ Tracking Error Signal=$(E1+E2)-(F1+F2)$ wherein A, B, E1, E2, F1 and F2 represent respective outputs from the divided light receiving element H (the light receiving parts A and B), the divided light receiving element J (the light receiving parts C and D) and the light receiving elements E1, E2, F1 and F2 of the second light detector 63.

Here, to maintain the quality of the push-pull signal, the main spot $S_{1S}$ formed on the divided light receiving element H needs to be made as large as possible.

However, the conventional optical head is designed so that the light intensity of the main spot $S_{1S}$ is as a few times as large as the light intensities of the sub-spots $S_{2S}$ and $S_{3S}$. Therefore, when the main spot $S_{1S}$ is large, or when the main spot $S_{1S}$ shifts with time, a part of the main spot $S_{1S}$ falls on the light receiving elements E1 and F1 designated for the sub-spots. Consequently, the main spot $S_{1S}$ interferes the sub-spots $S_{2S}$ and $S_{3S}$, causing a problem of breaking the balance of the tracking error signal.

A solution for the problem is to use a larger light receiving element that provides enough wide distances between the main spot $S_{1S}$ and the sub-spots $S_{2S}$ and $S_{3S}$ to prevent the interference. However, this increases the light receiving element in size and poses an obstacle in producing a thinner and cheaper optical head.

SUMMARY OF THE INVENTION

An object of the present invention is to offer a more reliable optical head causing no interference between a main spot and sub-spots even without a larger light receiving element.

In order to accomplish the object, an optical head in accordance with the present invention is characterized in that it includes: a light source for radiating a light beam; a diffraction grating for dividing the light beam radiated from the light source into a main beam for detecting information signals and sub-beams for tracking, the main beam and the sub-beams irradiating an optical recording medium; a plurality of plurally divided light receiving elements for receiving the beams reflected by the optical recording medium at a plurality of light receiving parts into which each of the plurally divided light receiving elements is divided, the light receiving parts being disposed adjacent to each other so as to detect a light intensity change resulting from diffraction by a guide groove formed on the optical recording medium; and beam shaping means for shaping the reflected beams so that spots formed by the reflected light beams on the plurally divided light receiving elements take elliptic shapes that are flattened in a direction in which a main spot corresponding to the main beam and sub-spots corresponding to the sub-beams are arranged.

With the configuration, the light beam radiated from the light source is divided by the diffraction grating into the main beam for detecting the information signals and the sub-beams for tracking. Then the divided light beams are radiated at the optical recording medium.

The beams reflected by the optical recording medium are shaped by the beam shaping means so that the spots of the reflected light beams take elliptic shapes that are flattened in the direction in which the main spot corresponding to the main beam and the sub-spots corresponding to the sub-beams are arranged. Then the reflected beams are received at the plurally divided light receiving elements. The plurally divided light receiving elements are divided into the light receiving parts so as to detect a light intensity change resulting from diffraction by the guide groove formed on the optical recording medium.

Accordingly, the beams reflected by the optical recording medium are shaped so that the spot diameters of the reflected beams are shortened only in a direction in which the main spot is likely to interfere the sub-spots. This configuration can prevent interference between the main spot and the sub-spots. Consequently, reliability of the information signals can be ensured and reliability of the optical head can be thereby improved.

Besides, the plurally divided light receiving elements are normally rectangular with the length thereof running horizontally. Therefore, the spots formed on the plurally divided light receiving elements can be easily expanded in a direction where no inconvenience is caused, such as the interference between the spots as a result of elongating the spot diameters of the reflected beams, i.e., only in the length direction of the rectangle.

If the beam shaping means has another function as a light path turning member for turning and thus directing the beam reflected by the optical recording medium to the plurally divided light receiving elements, and the light path turning member includes a concave cylindrical mirror, the above effects can be easily obtained.

Specifically, the beam shaping means includes the concave cylindrical mirror instead of a light path turning member which is conventionally used as a component. Therefore, the above-mentioned effects can be easily obtained by a simple work of replacing a member of a conventional optical head.

If the beam shaping means includes a convex cylindrical lens, and is disposed in a light path between the optical recording medium and the plurally divided light receiving elements so that the beams reflected by the optical recording medium travels straightly through the convex cylindrical lens and hits the plurally divided light receiving elements, the following workings and effects can be realized.

That is, the convex cylindrical lens enables the beams reflected by the optical recording medium to directly hit the plurally divided light receiving elements without being turned. Therefore, the above effects can be easily obtained by this configuration even in an optical head employing no light path turning member.

In addition, preferably, if one of the plurally divided light receiving elements is divided into the light receiving parts by a dividing line that runs in a direction corresponding to a direction of the guide groove, and the other plurally divided light receiving element is divided into the light receiving parts by a dividing line that runs in a direction orthogonal to the direction corresponding to the direction of the guide groove, the following workings and effects can be achieved.

That is, one of the plurally divided light receiving element can easily detect a spot position with respect to the direction that is orthogonal to the direction corresponding to the direction of the guide groove. Besides, the other plurally divided light receiving element can easily detect a spot position with respect to the direction corresponding to the direction of the guide groove.

For a fuller understanding of the nature and advantages of the invention, reference should be made to the ensuing detailed description taken in conjunction with the accompanying drawings.

DESCRIPTION OF THE EMBODIMENTS

[FIRST EMBODIMENT]

Referring to FIGS. 1 through 4, the following description will discuss an embodiment in accordance with the present invention.

Figure 2:
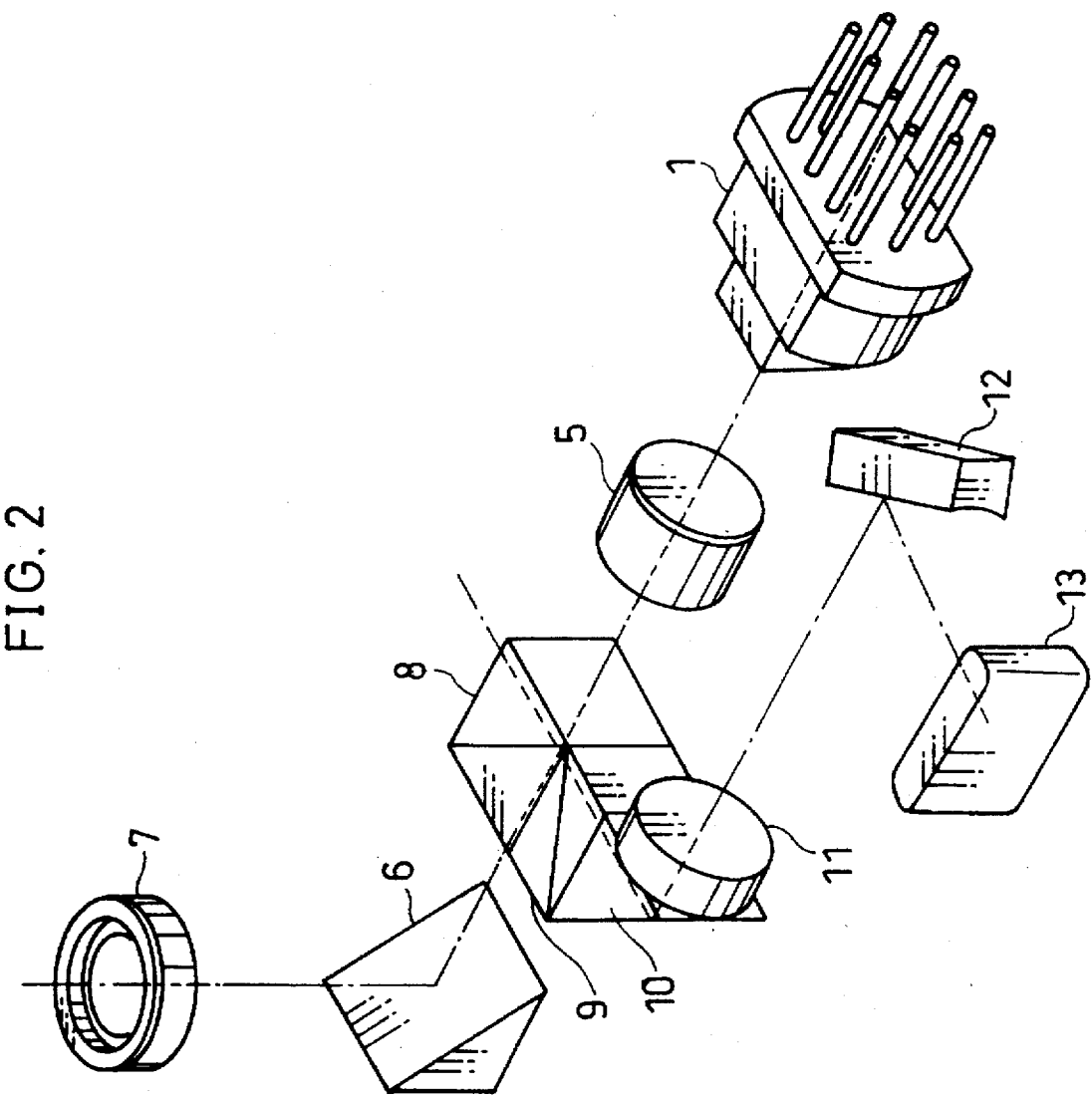
FIG. 2 is a perspective view schematically showing an overall configuration of the optical head.

An optical disk in accordance with the present invention, as shown in FIG. 2, includes a hologram laser 1, a collimating lens 5, a vertically turning mirror 6, an objective lens 7, a beam splitter 8, a Wollaston prism 9, a 45° mirror 10, a spot lens 11, a concave cylindrical mirror 12 (beam shaping means, beam path turning member) and a second light detector 13.

Figure 3:
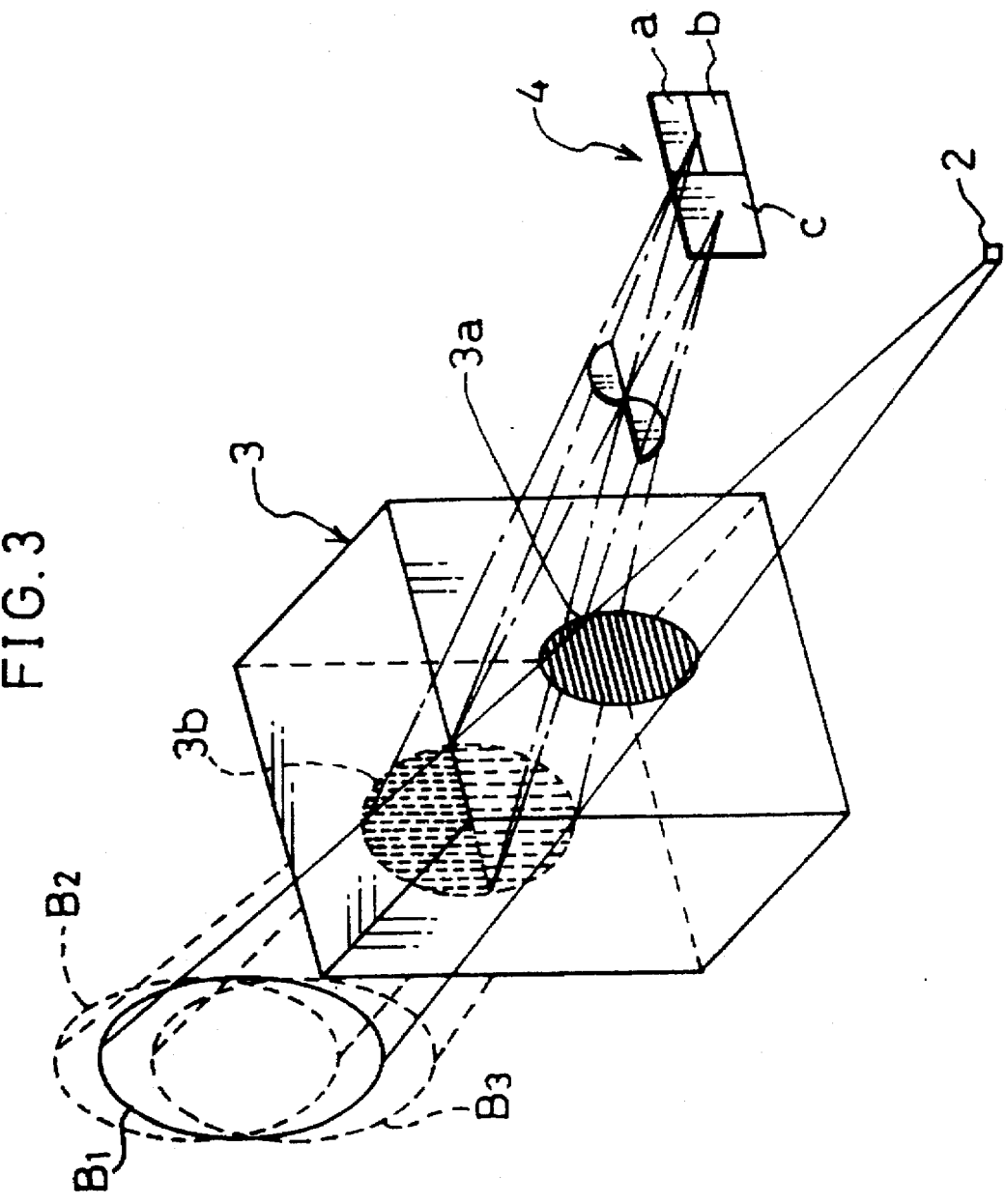
FIG. 3 is an explanatory drawing showing an optical system of a hologram laser provided to the optical head.

The hologram laser 1, as shown in FIG. 3, includes a semiconductor laser 2 (light source), a hologram element 3, and a first light detector 4. The semiconductor laser 2 is for radiating a light beam to an optical recording medium such as a mini disk. A grating $3a$ is formed on a side surface of the hologram element 3 which faces the semiconductor laser 2. The grating $3a$ is a diffraction grating for dividing a light beam from the semiconductor laser 2 into three light beams. A hologram $3b$ whose pitches differ from area to area is formed on a side surface of the hologram element 3 which is opposite from the semiconductor laser 2. The hologram $3b$ is for diffracting a beam reflected by, for example, the mini disk towards the first light detector 4.

The first light detector 4 is a light detector for detecting a focus error signal for a servo control, and is composed of a divided light receiving element, which is divided into three light receiving parts a, b and c. The focus error signal detected by the first light detector 4 is given by the following equation:

$$\text{Focus error signal} = a - b$$

wherein a and b represent respective outputs from the light receiving parts a and b.

The collimating lens 5 is for converting a light beam radiated from the semiconductor laser 2 into a collimated light beam. The vertically turning mirror 6 is for guiding a light beam to the disk. The objective lens 7 is for converging a light beam from the vertically turning mirror 6 at the disk.

Moreover, the beam splitter 8 is for splitting a reflected beam from the disk into two beams: one towards the collimating lens 5 and the other towards the Wollaston prism 9. The Wollaston prism 9 is for separating the light beams reflected by the disk and then split by the beam splitter 8 into an S-component and a P-component that have polarization properties (See FIG. 1).

The 45° mirror 10 is for guiding the light beam from the Wollaston prism 9 to the spot lens 11. The spot lens 11 is for converging the separated lights separated by the Wollaston prism 9 at a predetermined place of the second light detector 13.

The concave cylindrical mirror 12 is for turning and guiding the light beam converged by the spot lens 11 to the second light detector 13, and is designed to shape light beam spots into ellipses that are flattened in a direction in which a main spot $S_{1S}$ ($S_{1P}$) and a sub-spot $S_{2S}$ ($S_{2P}$) are arranged, or in a direction in which the main spot $S_{1S}$ ($S_{1P}$) and a sub-spot $S_{3S}$ ($S_{3P}$) are arranged.

Figure 1:
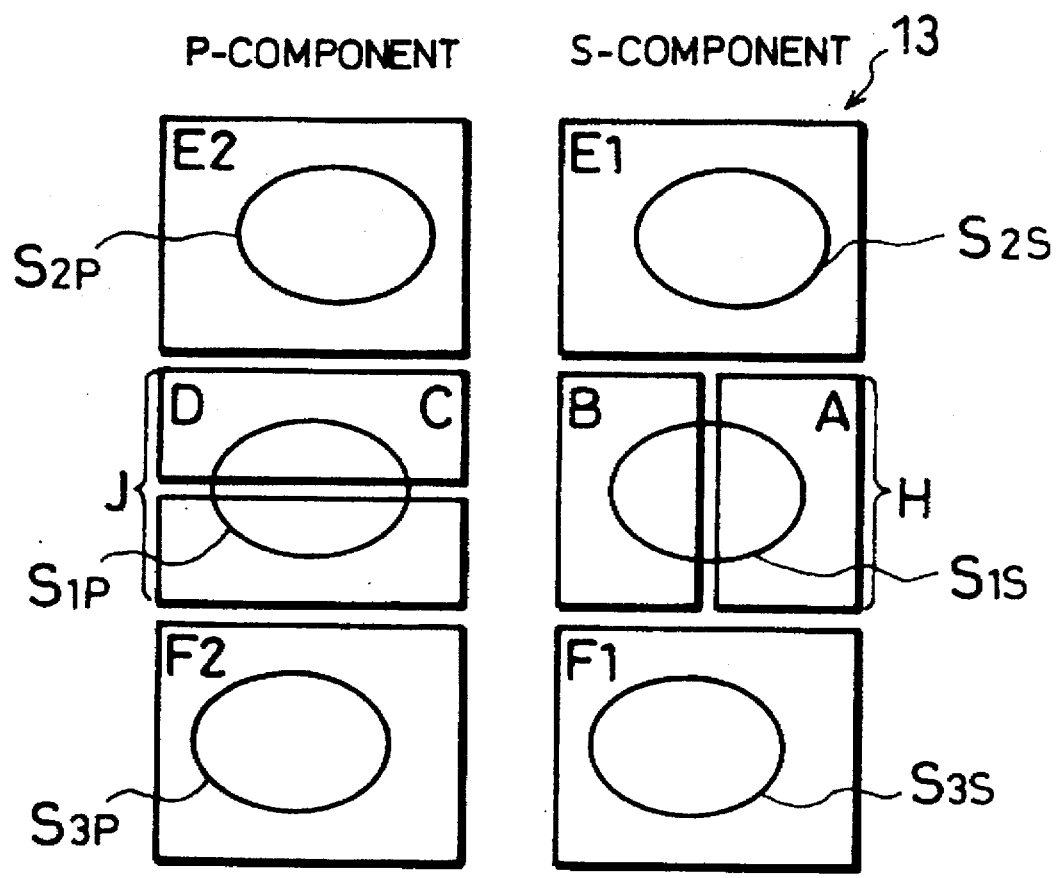
FIG. 1, illustrating an embodiment in accordance with the present invention, is an explanatory drawing showing a configuration of light receiving elements of a second light detector provided to an optical head and also showing shapes of spots formed on the light receiving elements.

The second light detector 13 is a light detector for information signals, a push-pull signal and a tracking error signal, and is composed of two light receiving element groups arranged axially symmetrically as shown in FIG. 1.

In FIG. 1, the right-hand light receiving element group includes a divided light receiving element H (plurally divided light receiving element) and light receiving elements E1 and F1. The divided light receiving element H includes divided light receiving parts A and B. The light receiving elements E1 and F1 are placed adjacently above and below the divided light receiving element H respectively. Meanwhile, the left-hand light receiving element group includes a divided light receiving element J (plurally divided light receiving element) and light receiving elements E2 and F2. The divided light receiving element J includes divided light receiving parts C and D. The light receiving elements E2 and F2 are placed adjacently above and below the divided light receiving element J respectively. The divided light receiving element H is a divided light receiving element for detecting the push-pull signal, whereas the light receiving elements E1, F1, E2 and F2 are elements for detecting the tracking error signal for a servo control.

In other words, the divided light receiving element H is divided into a plurality of light receiving parts so as to be capable of detecting a light intensity change resulting from diffraction by a guide groove formed on the disk. More specifically, the divided light receiving element H is divided into a plurality of light receiving parts A and B by a dividing line that runs in a direction corresponding to a direction of a guide groove. Besides, the divided light receiving element J is divided into a plurality of light receiving parts C and D by a dividing line that runs in a direction orthogonal to the direction corresponding to the direction of the guide groove. The light receiving parts are thus configured to receive the respective beams reflected by the disk.

In addition, the separated light of the S-component is configured to hit the right-hand light receiving element group of the second light detector 13 and to form spots thereon, whereas the separated light of the P-component is configured to hit the left-hand light receiving element group and to form spots thereon.

In the above configuration, a laser beam from the semiconductor laser 2 is divided by the grating 3a of the hologram element 3 into three beams: a main beam $B_1$, a positive first order sub-beam $B_2$ and a negative first order sub-beam $B_3$. Zero order diffracted lights of the three beams that have passed through the hologram 3b are converted by the collimating lens 5 into a collimated beam, guided by the vertically turning mirror 6, and converged by the objective lens 7. As a result, a main spot and two sub-spots are formed straightly along the guide groove of the disk.

The beams reflected by the disk, after passing through the objective lens 7 and the vertically turning mirror 6, are split by the beam splitter 8 into two lights: one towards the collimating lens 5 and the other towards the Wollaston prism 9. One of the light beams that has been split towards the collimating lens 5 is diffracted by the hologram 3b of the hologram element 3, and the first order diffracted lights of that light beam hit the first light detector 4.

Figure 4:
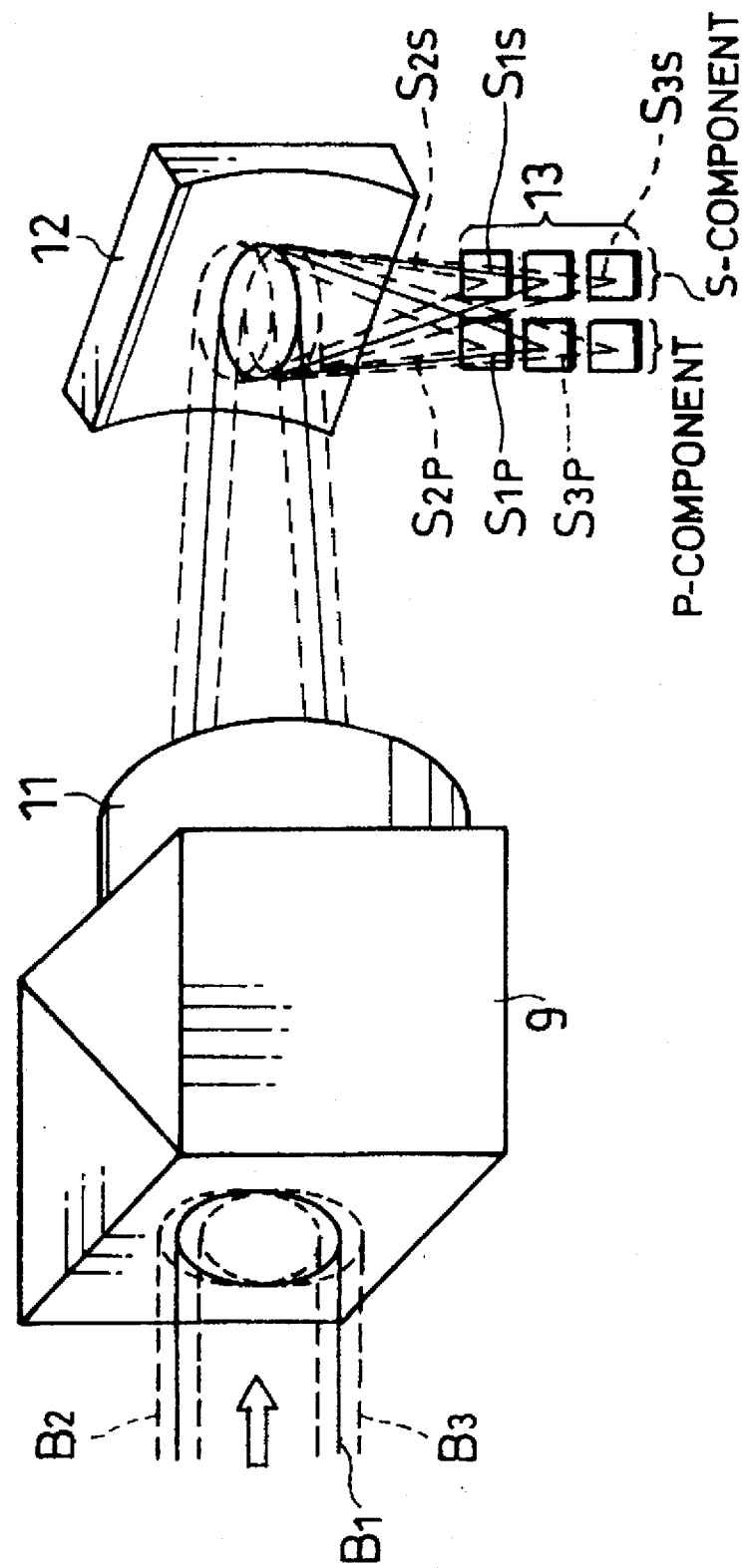
FIG. 4 is an explanatory drawing showing an optical system for guiding a reflected beam to the second light detector.

On the other hand, the light beam split towards the Wollaston prism 9 is separated by the Wollaston prism 9 into an S-component and a P-component that have polarization properties. Then, as shown in FIG. 4, those separated light beams, after passing through the spot lens 11 and the concave cylindrical mirror 12, are converged at the second light detector 13.

The concave cylindrical mirror 12 shapes spots formed on the second light detector 13 by the separated light beams into ellipses that are flattened in a direction in which the main spot $S_{1S}$ ($S_{1P}$) and the sub-spot $S_{2S}$ ($S_{2P}$) are arranged, or in a direction in which the main spot $S_{1S}$ ($S_{1P}$) and the sub-spot $S_{3S}$ ($S_{3P}$) are arranged.

As for the separated light of the S-component, the main spot $S_{1S}$ corresponding to the main beam $B_1$ is formed on the divided light receiving element H, and the sub-spots $S_{2S}$ and $S_{3S}$ corresponding to the sub-beams $B_2$ and $B_3$ are formed on the light receiving elements E1 and F1 respectively. Meanwhile, as for the separated light of the P-component, the main spot $S_{1P}$ corresponding to the main beam $B_1$ is formed on the divided light receiving element J, and the sub-spots $S_{2P}$ and $S_{3P}$ corresponding to the sub-beams $B_2$ and $B_3$ are formed on the light receiving elements E2 and F2 respectively.

A position adjustment is carried out in the direction that is orthogonal to the direction corresponding to the direction of the guide groove, i.e., in the lateral direction, according to the light quantity of the main spot $S_{1S}$ detected by the light receiving parts A and B of the divided light receiving element H. In addition, a position adjustment is carried out in the direction corresponding to the direction of the guide groove, i.e., in the longitudinal direction, according to the light quantity of the main spot $S_{1P}$ detected by the light receiving parts C and D of the divided light receiving element J.

With the optical head configured as above, the information signals (magneto-optical signal and pit signal), the push-pull signal and the tracking error signal of the disk are given by the following equations:

① Information Signals Magneto-Optical Signal=(A+B)−(C+D)

Pit Signal=A+B+C+D

② Push-Pull Signal=A−B

③ Tracking Error Signal=(E1+E2)−(F1+F2)

wherein A, B, E1, E2, F1 and F2 represent respective outputs from the divided light receiving element H (the light receiving parts A and B), the divided light receiving element J (the light receiving parts C and D) and the light receiving elements E1, E2, F1 and F2 of the second light detector 13.

Since there is no interference among the divided light receiving element H (the light receiving parts A and B), the divided light receiving element J (the light receiving parts C and D) and the light receiving elements E1, E2, F1 and F2, the information signals and the tracking error signal can be precisely obtained with the above equations.

As discussed so far, with the optical head in accordance with the present embodiment, a light beam reflected by a mini disk is converged at a divided light receiving element H (light receiving parts A and B), a divided light receiving element J (light receiving parts C and D) and light receiving elements E1, E2, F1 and F2. When the light beam is converged, beam shaping means such as a concave cylindrical mirror 12 shapes the light beam so that it forms on a second light detector 13 spots of elliptic shapes that are flattened in a direction in which a main spot $S_{1S}$ ($S_{1P}$) corresponding to a main beam $B_1$ for detecting information signals and a sub-spot $S_{2S}$ ($S_{2P}$) corresponding to a sub-beam $B_2$ for tracking are arranged, or in a direction in which the main spot $S_{1S}$ ($S_{1P}$) and a sub-spot $S_{3S}$ ($S_{3P}$) corresponding to a sub-beam $B_3$ for tracking are arranged. That is, the spot diameters of the reflected beam are shortened only in a direction in which the main spot $S_{1S}$ ($S_{1P}$) is likely to interfere the sub-spot $S_{2S}$ ($S_{2P}$), or in a direction in which the main spot $S_{1S}$ ($S_{1P}$) is likely to interfere the sub-spot $S_{3S}$ ($S_{3P}$).

Therefore, there is no interference between the main spot $S_{1S}$ ($S_{1P}$) and the sub-spot $S_{2S}$ ($S_{2P}$), and between the main spot $S_{1P}$ ($S_{1P}$) and the sub-spot $S_{3S}$ ($S_{3P}$). Consequently, the above configuration can ensure reliability of the information signals and thereby can improve reliability of the optical head.

Each light receiving surface of the divided light receiving element H (the light receiving parts A and B) and the divided light receiving element J (the light receiving parts C and D) as plurally divided light receiving elements, and of the light receiving elements E1, E2, F1 and F2 is normally rectangular with the length thereof being parallel to the longer axis of the above-mentioned ellipse. Therefore, the spots formed on the plurally divided light receiving elements can be easily expanded in a direction where no inconvenience is caused, such as interference between the spots, i.e., only in the length direction of the rectangle.

Moreover, in the present embodiment, the concave cylindrical mirror 12 constitutes the beam shaping means. That is, the concave cylindrical mirror 12 constitutes a light path turning member which was conventionally used as a component. Therefore, a simple work of replacing a member of a conventional optical head can easily produce the above-mentioned effects.

Furthermore, in the present embodiment, one of the divided light receiving elements (i.e., the divided light receiving element H) is divided into a plurality of light receiving parts A and B by a dividing line that runs in a direction corresponding to a direction of a guide groove. Besides, the other divided light receiving element (i.e., the divided light receiving element J) is divided into a plurality of light receiving parts C and D by a dividing line that runs in a direction orthogonal to the direction corresponding to the direction of the guide groove. With this reason, the divided light receiving element H can easily detect a spot position with respect to the direction that is orthogonal to the direction corresponding to the direction of the guide groove. Besides, the divided light receiving element J can easily detect a spot position with respect to the direction corresponding to the direction of the guide groove.

[SECOND EMBODIMENT]

Figure 5:
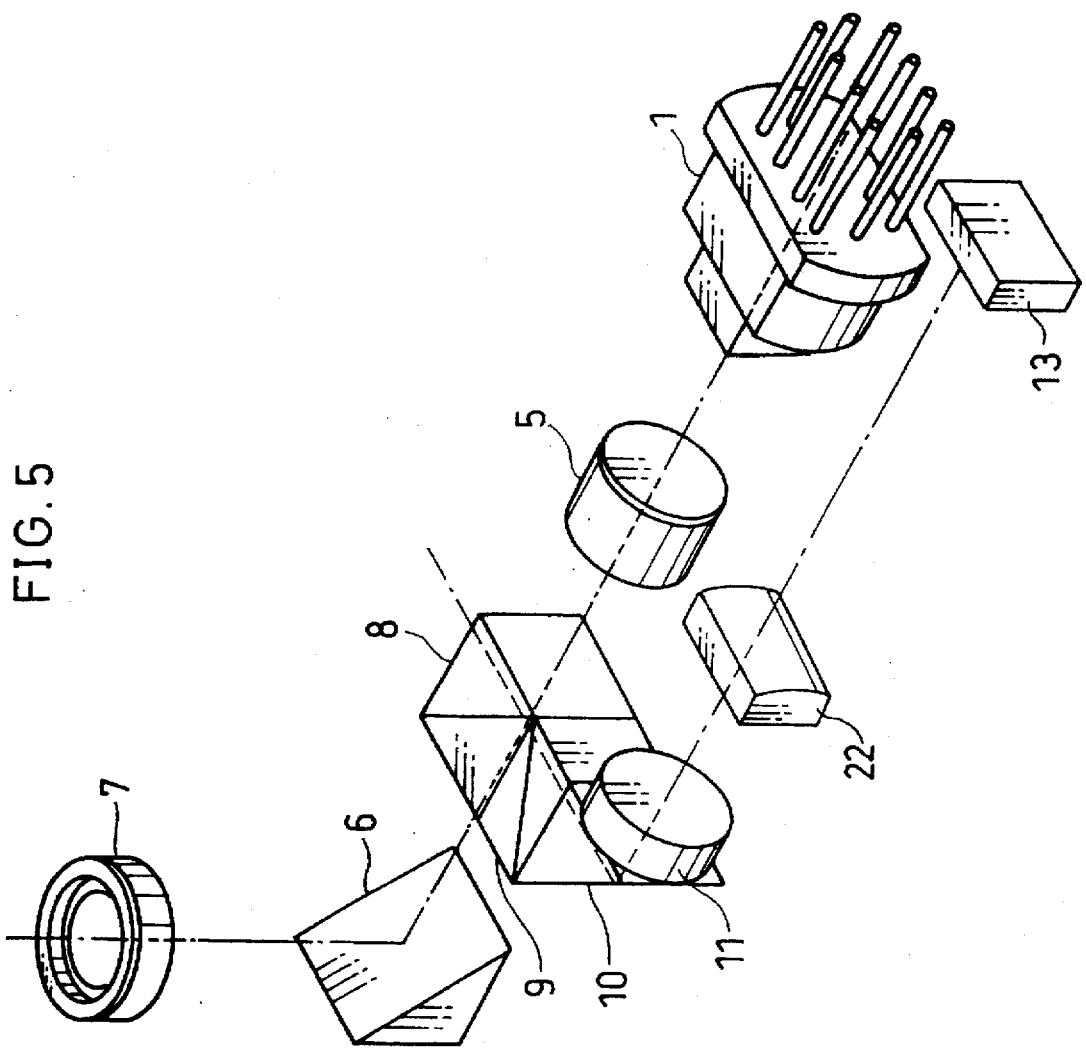
FIG. 5 is a perspective view schematically showing an overall configuration of an optical head of another embodiment in accordance with the present invention.
Figure 6:
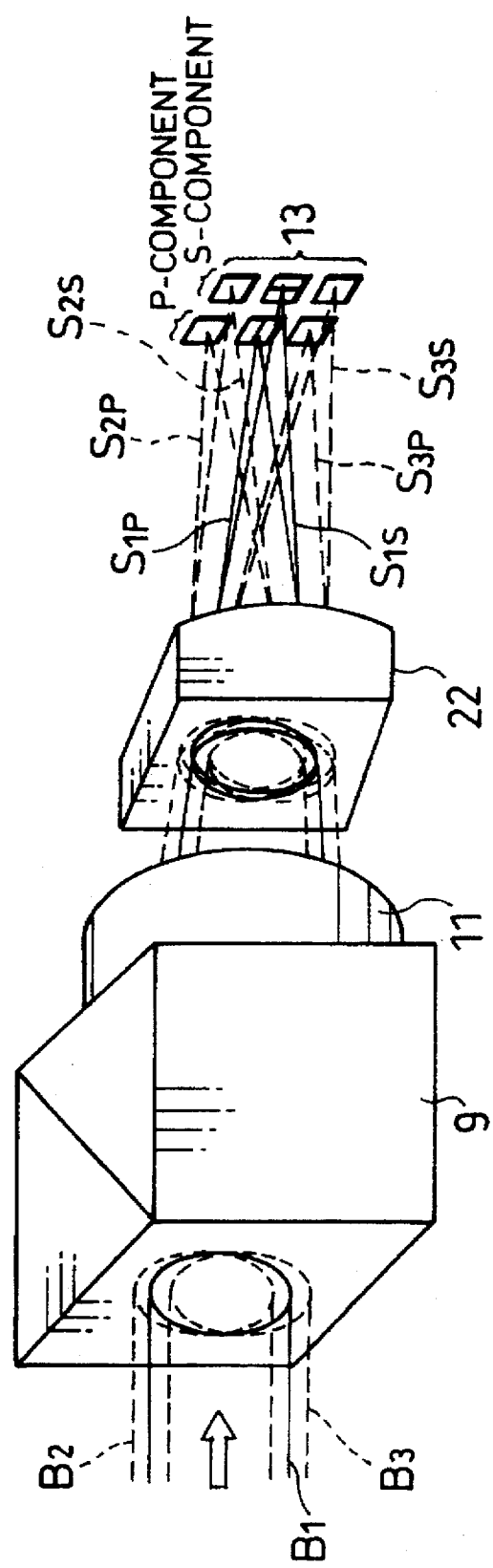
FIG. 6 is an explanatory drawing showing an optical system for guiding a reflected beam to a second light detector in the optical head.

Referring to FIGS. 5 and 6, the following description will discuss a second embodiment of the present invention. Here, for convenience, members of the second embodiment that have the same function as members shown in the drawings of the first embodiment are indicated by the same reference numerals and description thereof is omitted.

As shown in FIG. 5, an optical head of the present embodiment is provided with a cylindrical lens 22 (beam shaping means) of a convex shape (hereinafter, will be referred to as a convex cylindrical lens) in a light path between a spot lens 11 and a second light detector 13. That is, the optical head has a configuration that directs a beam reflected by the disk so that the reflected beam goes through the convex cylindrical lens 22 and directly hits the second light detector 13 without being turned. This configuration shapes the beam reflected by the disk into elliptic shapes that are flattened in a direction in which a main spot $S_{1S}$ ($S_{1P}$) and a sub-spot $S_{2S}$ ($S_{2P}$) are arranged, or in a direction in which the main spot $S_{1S}$ ($S_{1P}$) and a sub-spot $S_{3S}$ ($S_{3P}$) are arranged. In other words, in the present embodiment, the convex cylindrical lens 22 shapes the spots formed on the second light detector 13 into ellipses.

More specifically, as shown in FIG. 6, among the beams reflected by the disk, a main beam $B_1$, a positive first order sub-beam $B_2$ and a negative first order sub-beam $B_3$ are separated by passing through a Wollaston prism 9 into an S-component and a P-component that have polarization properties. The separated beams are converged at the second light detector 13 by the spot lens 11. When the separated beams are converged, the separated beams are shaped by the convex cylindrical lens 22 to form elliptic spots on the second light detector 13.

That is, as for the separated light of the S-component, the main spot $S_{1S}$ corresponding to the main beam $B_1$ is formed on a divided light receiving element H, and the sub-spots $S_{2S}$ and $S_{3S}$ corresponding to the sub-beams $B_2$ and $B_3$ are formed on light receiving elements E1 and F1 respectively. Meanwhile, as for the separated light of the P-component, the main spot $S_{1P}$ corresponding to the main beam $B_1$ is formed on a divided light receiving element J, and the sub-spots $S_{2P}$ and $S_{3P}$ corresponding to the sub-beams $B_2$ and $B_3$ are formed on light receiving elements E2 and F2 respectively.

In other words, the spots converged on the second light detector 13 take elliptic shapes that are flattened in a direction in which the main spot $S_{1S}$ ($S_{1P}$) and the sub-spot $S_{2S}$ ($S_{2P}$) are arranged, or in a direction in which the main spot $S_{1S}$ ($S_{1P}$) and the sub-spot $S_{3S}$ ($S_{3P}$) are arranged.

As discussed above, the optical head of the present embodiment is provided with a convex cylindrical lens 22 as beam shaping means in a light path directing beams reflected by the disk to plurally divided light receiving elements. Therefore, an optical head employing no cylindrical mirror as a light path turning member can easily produce the same effects as explained in the first embodiment by employing the configuration of the present embodiment. That is, the interference can be prevented between the main spot $S_{1S}$ ($S_{1P}$) and the sub-spot $S_{2S}$ ($S_{2P}$) and between the main spot $S_{1S}$ ($S_{1P}$) and the sub-spot $S_{3S}$ ($S_{3P}$). Consequently, reliability of the information signals can be ensured and reliability of the optical head can be thereby improved.

[THIRD EMBODIMENT]

Figure 7:
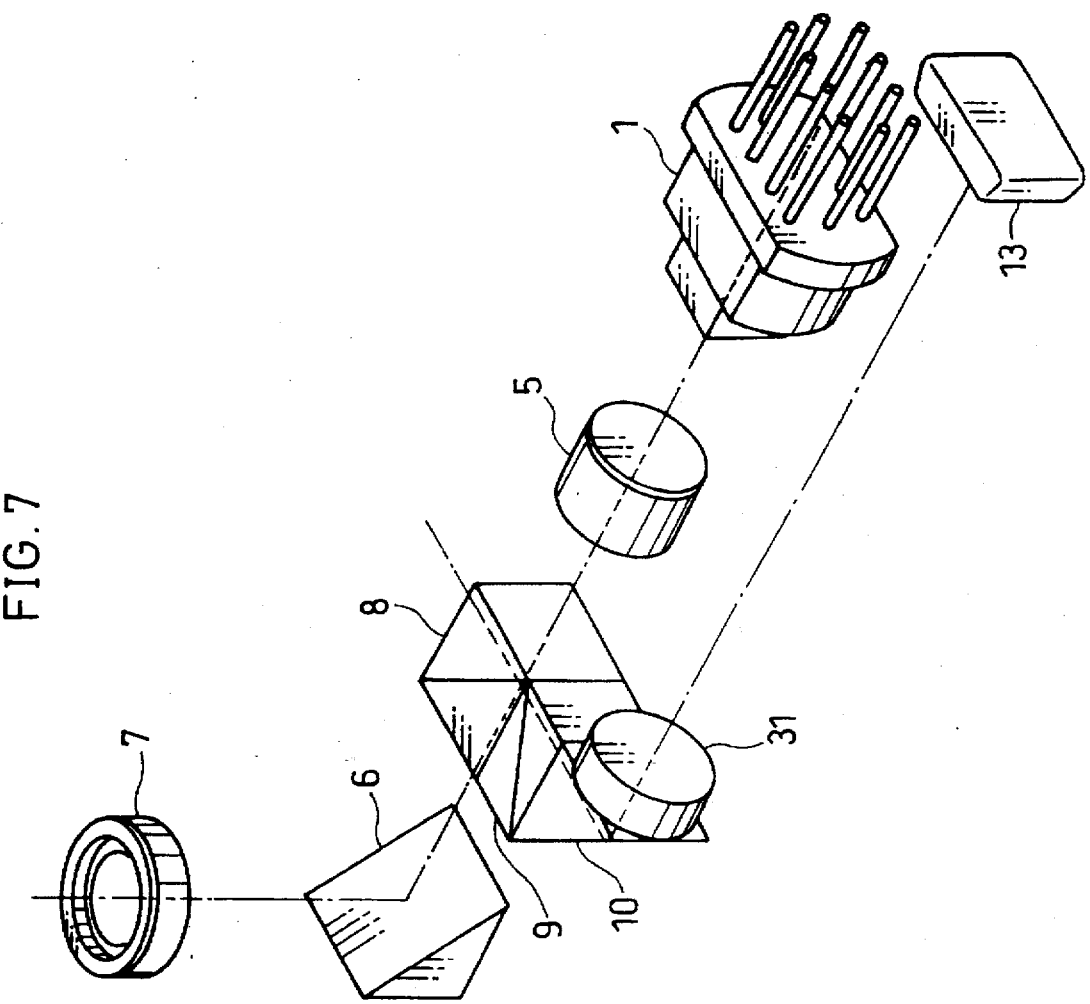
FIG. 7 is a perspective view schematically showing an overall configuration of an optical head of even another embodiment in accordance with the present invention.

Referring to FIG. 7, the following description will discuss a third embodiment of the present invention. Here, for convenience, members of the third embodiment that have the same function as members shown in the drawings of the first and second embodiments are indicated by the same reference numerals and description thereof is omitted.

As shown in FIG. 7, an optical head of the present embodiment is provided with a spot lens 31 (a light converging member) instead of the spot lens 11 used in the first and second embodiments, and has a configuration that directs a beam reflected by a disk so that the reflected beam goes through a 45° mirror 10 and the spot lens 31 and directly hits a second light detector 13 without being turned.

Composed of a non-spherical surface lens with astigmatism, the spot lens 31 is designed so that spots formed by light passing therethrough take elliptic shapes that are flattened in a direction in which a main spot $S_{1S}$ ($S_{1P}$) and a sub-spot $S_{2S}$ ($S_{2P}$) are arranged, or in a direction in which the main spot $S_{1S}$ ($S_{1P}$) and a sub-spot $S_{3S}$ ($S_{3P}$) are arranged.

With the above configuration, the beam reflected by the disk is directed so as to go through the 45° mirror 10 and the spot lens 31 and directly hit the second light detector 13 without being turned. When the reflected beam hits the second light detector 13, the elliptic light spots shown in the first and second embodiments are formed on the second light detector 13.

As discussed above, in the optical head of the present embodiment, the beam shaping means is constituted of the spot lens 31 that is composed of a non-spherical surface lens with astigmatism and that functions as a light converging member for directing a beam reflected by a mini disk to plurally divided light receiving elements. Therefore, the same effects as explained in the first and second embodiments can be obtained.

Also, with the above configuration, the beam shaping means can be configured simply by replacing the spot lens 11 conventionally used as a component with the spot lens 31. Therefore, a simple work of replacing the spot lens 11 with the spot lens 31 can easily produce the same effects as the first and second embodiments.

[FOURTH EMBODIMENT]

Figure 8:
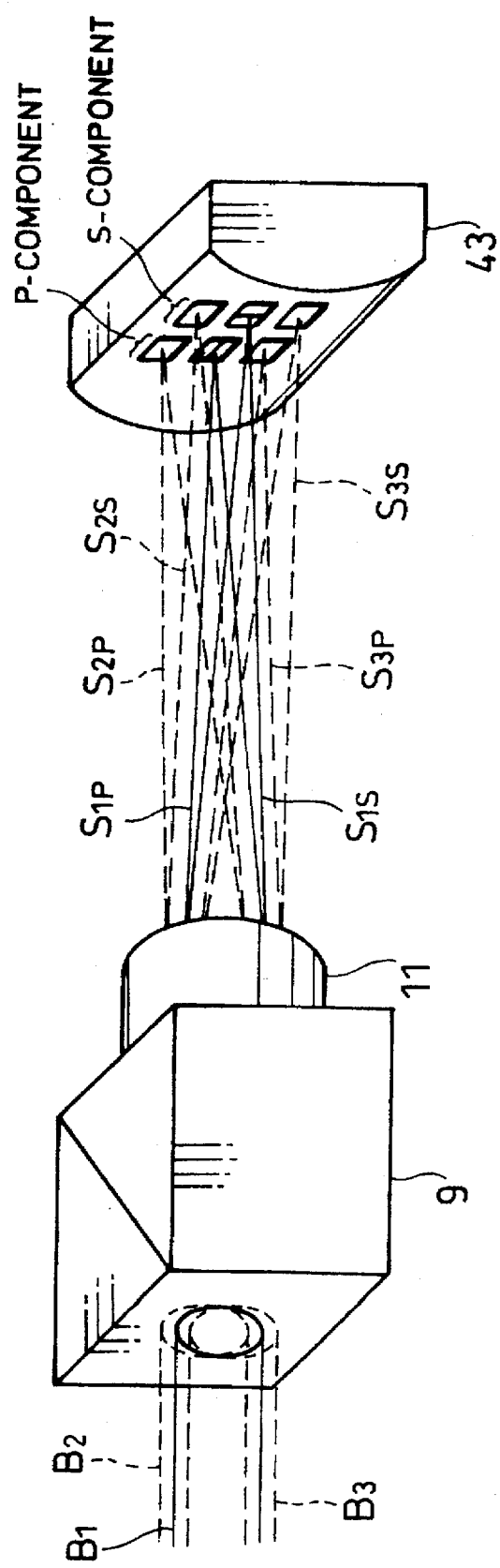
FIG. 8 is an explanatory drawing showing an optical system for guiding a reflected beam to a second light detector in an optical head of a further embodiment in accordance with the present invention.
Figure 9:
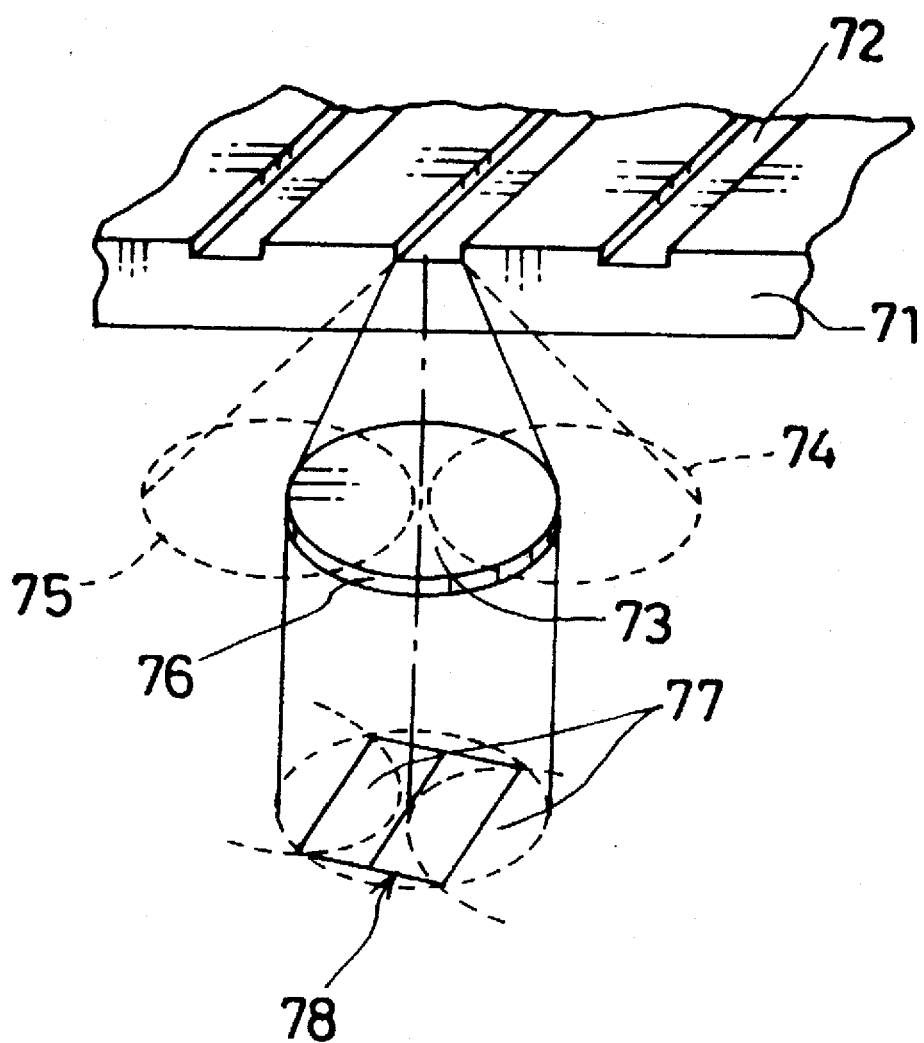
FIG. 9 is an explanatory drawing showing the principle of a push-pull method.
Figure 10:
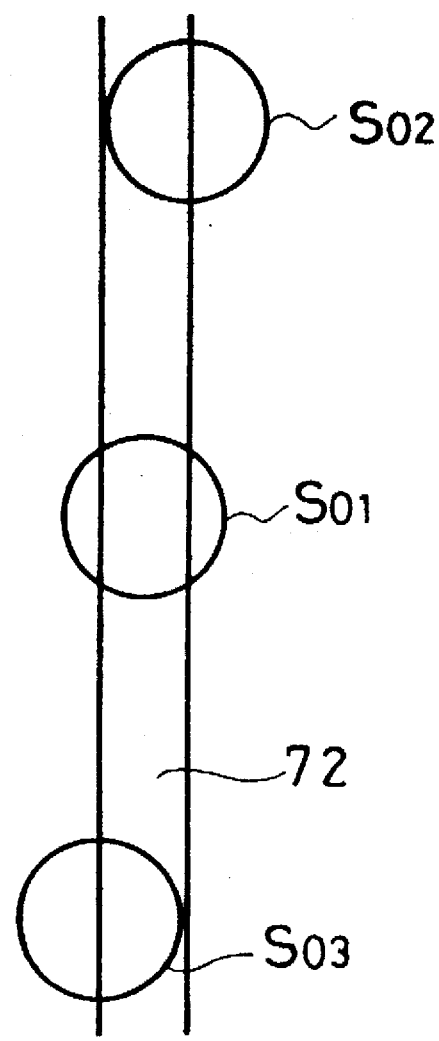
FIG. 10 is an explanatory drawing showing positions of three beam spots formed along a guide groove of a disk.
Figure 11:
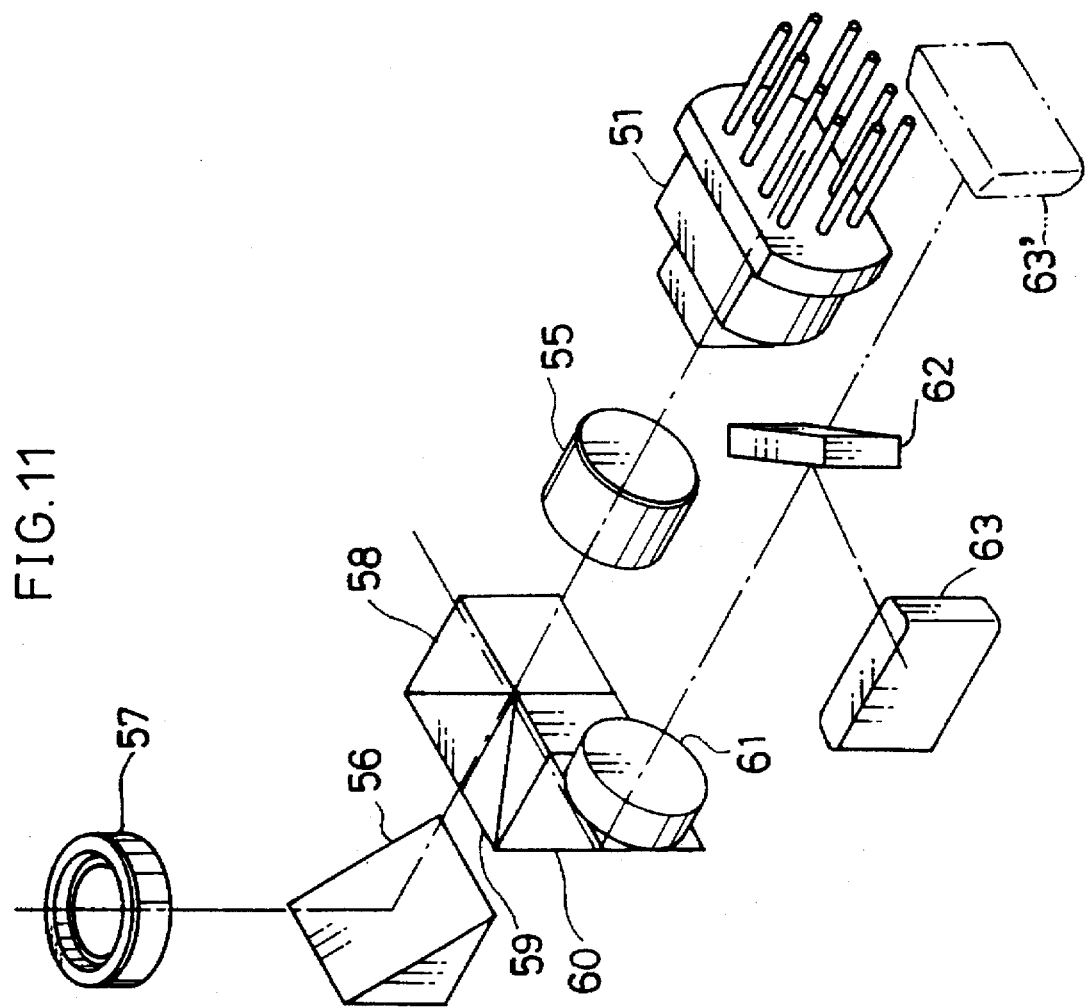
FIG. 11 is a perspective view schematically showing an overall configuration of a conventional optical head.
Figure 12:
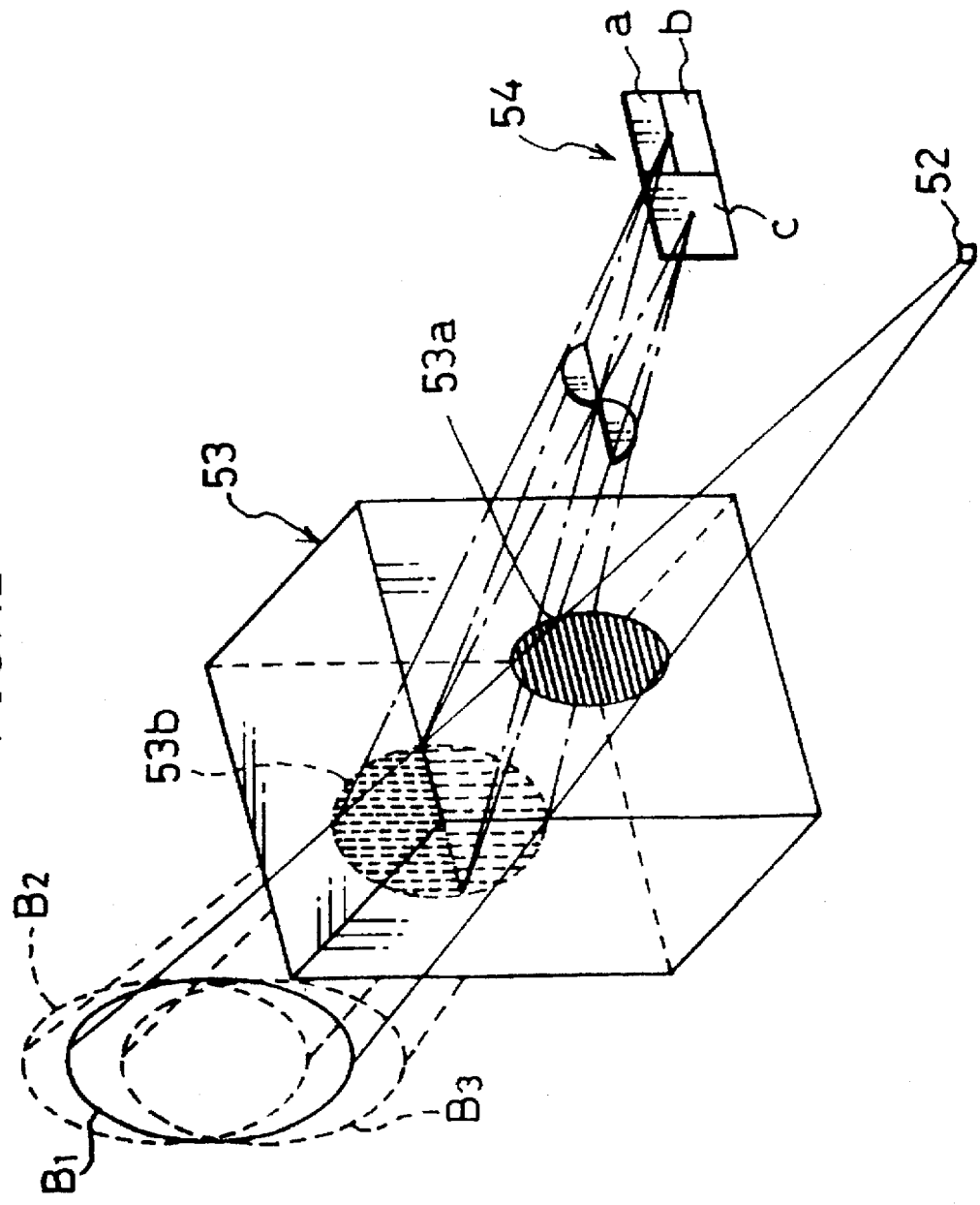
FIG. 12 is an explanatory drawing showing an optical system of a hologram laser provided to the optical head.
Figure 13:
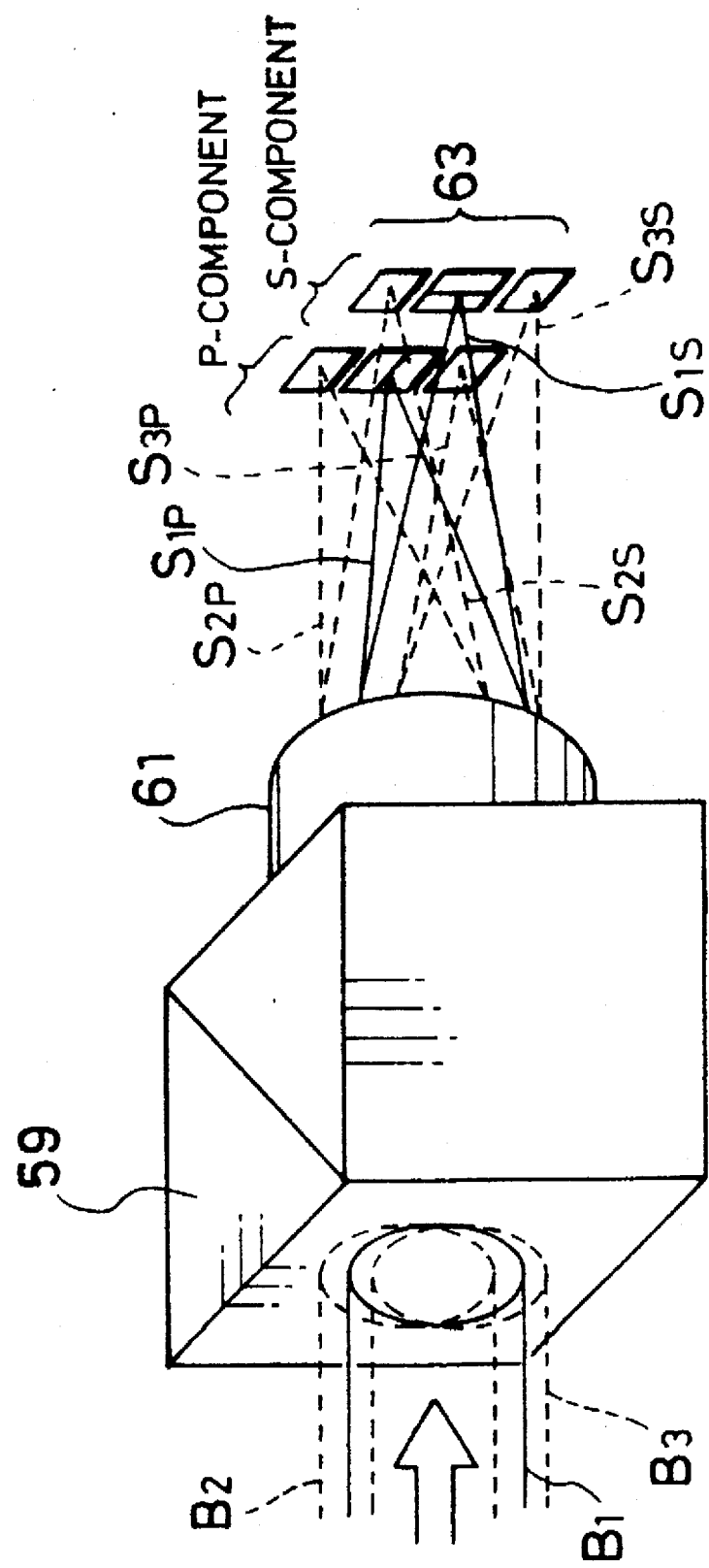
FIG. 13 is an explanatory drawing showing an optical system for guiding a reflected beam to a second light detector in the optical head.
Figure 14:
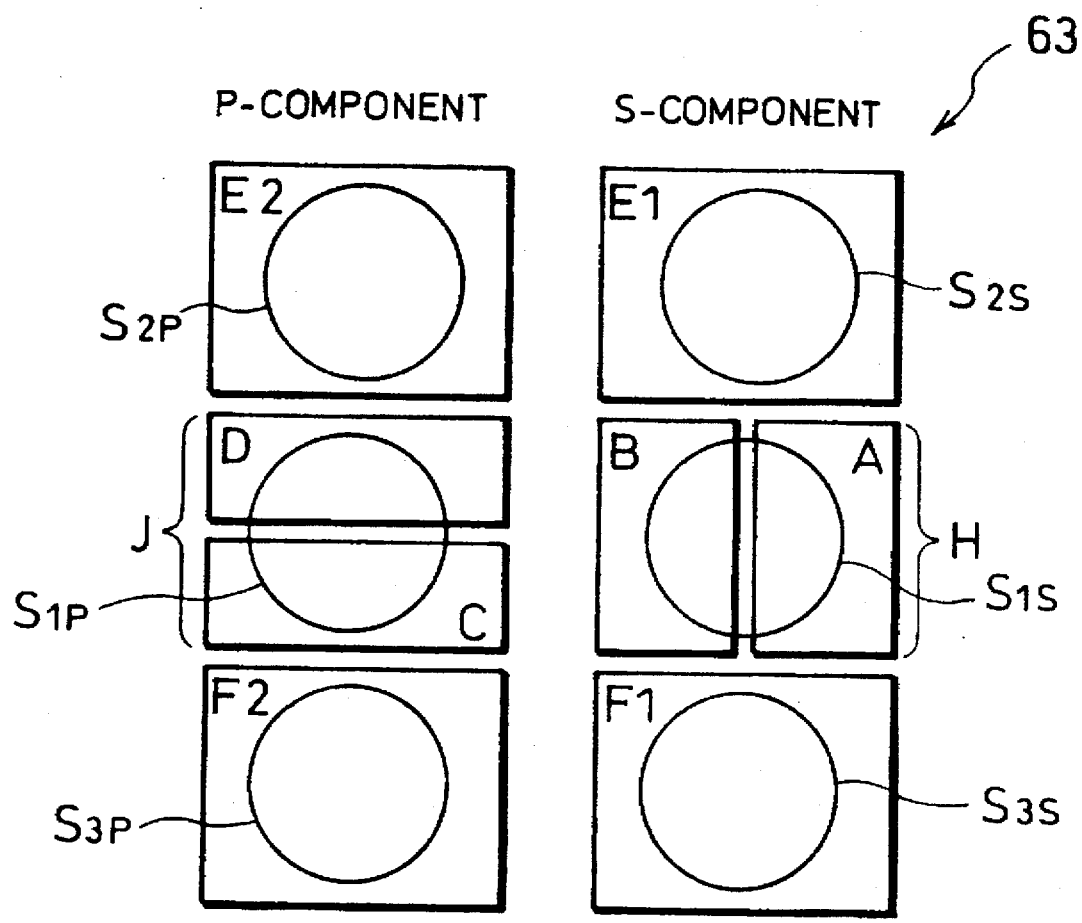
FIG. 14 is an explanatory drawing showing a configuration of light receiving elements of the second light detector and also showing shapes of spots formed on the light receiving elements.

Referring to FIG. 8, the following description will discuss a fourth embodiment of the present invention. Here, for convenience, members of the fourth embodiment that have the same function as members shown in the drawings of the first embodiment are indicated by the same reference numerals and description thereof is omitted.

As shown in FIG. 8, an optical head of the present embodiment is provided with a second light detector 43 (beam shaping means, plurally divided light receiving elements) instead of the second light detector 13 used in the first embodiment, and has a configuration that directs a beam reflected by a disk so that the reflected beam goes through a 45° mirror 10 and a spot lens 11 and directly hits the second light detector 13 without being turned.

Having a front surface made of a resin of a convex cylindrical shape, the second light detector 43 is designed so that spots formed on the surface thereof take elliptic shapes that are flattened in a direction in which a main spot $S_{1S}$ ($S_{1P}$) and a sub-spot $S_{2S}$ ($S_{2P}$) are arranged, or in a direction in which the main spot $S_{1S}$ ($S_{1P}$) and a sub-spot $S_{3S}$ ($S_{3P}$) are arranged.

In the present embodiment, the beam reflected by the mini disk is converged by the spot lens 11 as in the first embodiment and then directed to the second light detector 43 without being turned. The elliptic main spot $S_{1S}$ ($S_{1P}$) and the elliptic sub-spots $S_{2S}$ ($S_{2P}$) and $S_{3S}$ ($S_{3P}$) are formed on the surface of the second light detector 43 in this manner.

In other words, in the present embodiment, the second light detector 43 is configured to have a cylindrical shape where the resin front surface thereof is convex. This configuration shapes the spots formed on the surface of the second light detector 43 into elliptic shapes that are flattened in a direction in which the main spot $S_{1S}$ ($S_{1P}$) corresponding to a main beam $B_1$ for detecting information signals and the sub-spot $S_{2S}$ ($S_{2P}$) corresponding to a sub-beam $B_2$ for a tracking error signal are arranged, or in a direction in which the main spot $S_{1S}$ ($S_{1P}$) and the sub-spot $S_{3S}$ ($S_{3P}$) corresponding to a sub-beam $B_3$ for a tracking error signal are arranged.

That is, the beams on the second light detector 43 have the same shapes as those shown in FIG. 1. Therefore, the same effects as the first, second and third embodiments can be obtained.

Moreover, the second light detector 43 is configured to have a cylindrical shape where the resin front surface thereof is convex. Therefore, a simple work of replacing the plurally divided light receiving elements conventionally used as components with the second light detector 43 can easily realize the beam shaping means.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An optical head, comprising:

a light source for radiating a light beam;

a diffraction grating for dividing the light beam radiated from the light source into a main beam for detecting information signals and sub-beams for tracking, the main beam and the sub-beams irradiating an optical recording medium;

a plurality of plurally divided light receiving elements for receiving the beams reflected by the optical recording medium at a plurality of light receiving parts into which each of the plurally divided light receiving elements is divided, the light receiving parts being disposed adjacent to each other so as to detect a light intensity change resulting from diffraction by a guide groove formed on the optical recording medium; and beam shaping means for shaping the reflected beams so that spots formed by the reflected light beams on the plurally divided light receiving elements take elliptic shapes that are flattened in a direction in which a main spot corresponding to the main beam and sub-spots corresponding to the sub-beams are arranged.

2. The optical head as defined in claim 1, wherein the beam shaping means has another function as a light path turning member for turning and thus guiding the beam reflected by the optical recording medium to the plurally divided light receiving elements.

3. The optical head as defined in claim 1, wherein the beam shaping means includes a convex cylindrical lens, and is disposed in a light path between the optical recording medium and the plurally divided light receiving elements so that the beams reflected by the optical recording medium travels straightly through the convex cylindrical lens and hits the plurally divided light receiving elements.

4. The optical head as defined in claim 1, wherein the beam shaping means has another function as a converging member for converging the beam reflected by the optical recording medium on the plurally divided light receiving elements.

5. The optical head as defined in claim 1, wherein the beam shaping means includes a plurally divided light receiving elements of a cylindrical shape forming a convex light receiving surface for the reflected beams.

6. The optical head as defined in claim 1, wherein one of the plurally divided light receiving elements is divided into the light receiving parts by a dividing line that runs in a direction corresponding to a direction of the guide groove, and the other plurally divided light receiving element is divided into the light receiving parts by a dividing line that runs in a direction orthogonal to the direction corresponding to the direction of the guide groove.

7. The optical head as defined in claim 2, wherein the light path turning member is a concave cylindrical mirror.

8. The optical head as defined in claim 4, wherein the converging member is a non-spherical surface lens with astigmatism.

* * * * *